United States Patent [19]

Kemp

[11] 4,096,287

[45] Jun. 20, 1978

[54] PREPARATION OF A POWDERED SKIM MILK ADDITIVE

[75] Inventor: Albert R. Kemp, Ashton, Ill.

[73] Assignee: Crest Foods Co., Inc., Ashton, Ill.

[21] Appl. No.: 812,665

[22] Filed: Jul. 5, 1977

Related U.S. Application Data

[63] Continuation of Ser. No. 650,252, Jan. 19, 1976, abandoned.

[51] Int. Cl.$^2$ .......................... A23C 9/00; A23C 1/04
[52] U.S. Cl. .................................. 426/588; 426/471; 426/522
[58] Field of Search ............... 426/580, 588, 522, 587, 426/471

[56] References Cited

PUBLICATIONS

Hall et al., Drying of Milk and Milk Products, 2nd ed., The Avi Publishing Co., Inc., Westport, Conn., 1971, pp. 129–131.

Webb, et al., By products from Milk, 2nd ed., The Avi Publishing Co., Inc., Westport, Conn., 1970, pp. 230–239.

*Primary Examiner*—David M. Naff
*Attorney, Agent, or Firm*—Louis Robertson

[57] ABSTRACT

A powdered skim milk additive for improving the flavor, texture and eye appeal of fluid milk products is prepared by a process involving non-dilutive heating skim milk to about 185° to 190° F, then heating by direct steam injection to about 200° F to 212° F, condensing the heated skim milk to about 39 to 45% solids, heating the condensed skim milk by non-dilutive heating to about 175° F, then heating by direct steam injection to at least about 185° F, and spray drying to produce the powdered skim milk additive.

1 Claim, No Drawings

PREPARATION OF A POWDERED SKIM MILK ADDITIVE

This is a continuation of Ser. No. 650,252, filed Jan. 19, 1976, and abandoned after the filing of this application.

INTRODUCTION

The invention of which the present disclosure is offered for public dissemination in the event adequate patent protection is available relates to the highly specialized field of heat-modified nonfat milk modifier-powders meeting the very severe requirements of being suitable for adding to skim milk or lowfat milk for improving their body, taste and eye appeal. It has been common practice for years to make skim milk feel, taste and look more like whole milk by adding to it a small percentage of lowfat milk powder.

For many years, the recommended percentage of such modifiers to be added was 0.5 to 2.0 percent. More recently, improved heat treatment of the milk prior to spray-drying it to produce the powder has increased its effectiveness to the extent that the recommended usage has dropped to 0.4 and even to 0.3 percent. Heat treatment to increase the effectiveness of the powder had been thought to have reached the ultimate commercially attainable. In fact, further heat treatment, inadvertently achieved, had been known to make the product unsuitable for this very demanding intended use. Hence, the recent processes for treating the nonfat milk to be powder-dried to provide the modifier required great care to avoid the excessive heat known to have deleterious effects. Part of the care involved occasional shutdown of the equipment for thorough cleaning, perhaps every eight hours.

Although it was long generally assumed that any modification (other than pasteurizing and drying) resulting from heat treatment in the production of powdered lowfat milk had no beneficial effects, applicant had determined that the modification can be beneficial. In the last two years or so, before the present invention, high-heat modified powder has been sold, resulting in the above-mentioned reduction of the percentage needed. According to the present invention, an extra step of noncoagulative direct steam-heating is added as a last treatment between heating heretofore practiced and spray-drying, and the beneficial modification of the proteins is so great that the recommended percentage is lowered one-sixth to one-third below the previous best. Thus the new powder is an ultra-effective modifier of fluid milk food products.

TYPICAL PRIOR PROCESS

The best prior process for producing food grade lowfat milk modifier-powder can be followed, except for the extra step of additional direct steam-heating as stated below, preferably with some trouble-reducing diminution of the immediately preceding heating by heat exchanger or other nondiluting heating. This best prior practice, which, except as otherwise noted, is now to be part of the treatment by the present invention, is the following:

Cold raw whole milk is warmed to about 120° F. by passing it through the first section of a plate heat exchanger, and cream is separated from the skim milk. The skim milk is conventionally pasteurized, e.g., by heating to about 170° F., with about a 20-second hold.

FOREWARMING OF SKIM

The hot pasteurized skim milk is further heated to 185° to 190° F. by passing through a second heat exchanger, either plate or tubular. As the terminal or final portion of the heating of the skim milk, it is heated by passing it through a steam injector unit to heat it to the range of 200° to 212° F. The specific termperature is usually chosen for suitability to the hold time, which is less easily varied in a continous process. The temperature is inversely varied according to the hold time of from 10 to 30 minutes, approximately. The heat treatment is a function of both time and temperature. In a continuous process both temperatures and hold times may vary somewhat. Furthermore, heat effects vary with milk composition, seasonal changes, total solids, and other factors such as genetic variations of the proteins. The upper limit of heat treatment is that heating where the milk proteins are stabilized to the extent that later condensed heating can achieve concurrent maximum denaturization of protein without taste impairment. One criteria is the characteristic cooked aroma sulfhydrl compounds release, which indicates heating of the skim is optimized. The cooked aroma evident from the proper heat treatment is similar to the cooked aroma from the heat treatment of whole milk during processing conventional evaporated milk.

CONDENSING

The skim milk product of the foregoing will have approximately 8.8% solids. It is now condensed to 39% to 45% solids in a conventional vacuum evaporator with a final stage of about 27 inches of vacuum and 120° F. temperature.

The condensed skim can either be cooled to about 45° F. to hold for later further processing or it may be continued directly to a conventional heater.

HEATING OF CONDENSED BY SURFACE-CONTACT HEATERS

The condensed milk from the steps described above is heated with a plate or tubular heater or heaters (or other conventional surface-contact non-diluting heaters) to at least about 175° F.

EXTRA NONCOAGULATIVE HEATING OF PRESENT INVENTION

According to the present invention as now practiced, the condensed skim milk resulting from the treatment above stated is then given further heat treatment by direct steam-heating, as by being passed through a conventional steam injector (as previously used for heating skim milk). The temperature of the condensed is thus raised to at least 185° F, the preferred normal range being 185°-200° F. with the specific temperature depending inversely on the hold time the equipment is providing. The hold time should be from 2 to 5 minutes in a hold tube at the same temperature. In other words, the protein-modifying heat treatment should be carried to the extent of being equivalent to holding at 200° F. for 2 minutes, if that is not the actual holding. The limiting factor is to avoid such increased viscosity as would make flow through the tubes erratic or cause coagulation. Temperatures over 200° F. may be used if a shorter run is planned, with the holding time further reduced, e.g. to one-half minute at 212° F.

SPRAY DRYING

The condensed milk thus heated is passed to a high-pressure pump which is used to feed the spray jets of a spray drier for the purpose of spray drying the condensed to provide the powder of this invention.

NEW PRODUCT

After the removal of water in the spray drier, the finished product is a new type of nonfat dry milk, more effective than previously produced.

This new powdered nonfat dry milk is used in proportions in the range of 0.1 to 0.5% in fluid milk products such as skimmilk, lowfat milk, half and half and butter milk. The heat treatment has so modified the proteins that a mere 0.1% to 0.15% yields an improvement that is detectable. In other words, when used in proportions which would have been deemed too low before this invention, it has the degree of effectiveness known in the trade as "detectable." Detectability is a recognized test believed suitable for use in the claims. 0.20% to 0.30% is the range of proportions most likely to be recommended, and a proportion within this range is most likely to be chosen.

ACHIEVEMENT

This invention yields a new improved form of modifier or additive that is more effective in transmitting texture and flavor to fluid dairy products than the previous comparable modifier product, so that smaller quantities suffice. It nevertheless meets the severe flavor requirements of skim milk and lowfat milk. The modifier or additive is as effective as adding prior low heat nonfat dry milk plus a hydrocolloid gum such s carrageenan. In fact, its effectiveness had led to a belief by skeptical observers that a gum was included. An important consideration is that the disclosed process can be dependably practiced with varying milks as are encountered in commercial practice.

Theoretically, the results could perhaps be attained with some milks by the same degree of heat treatment if it were reached using plate exchangers, tubular heaters or other non-diluting heating equipment; but at present such equipment, at such high temperature and hold time, is not able to dependably avoid poorer flavor, and cannot be operated continuously for long periods, such as 8 hours to more than a day, because of burn-on fouling the equipment and eventually forcing shutdown and clean up. Because the heat levels indicated, both before and after condensing, are deemed to be important or essential, a key to commercially practical practice of the present invention is direct steam heating at both points.

PLANNED IMPROVED USE OF THE INVENTION

Temperatures above boiling are not at present used, and have not been discussed in the foregoing description of processing techniques as now used because the equipment available in the drying plant is not suitable for such higher temperatures. To be sure to disclose the best form contemplated, the belief is noted that temperatures up to about 230° F., when suitable equipment is available, could be very beneficial in heating both the unconcentrated skim milk and condensed milk. Since time-temperature relationships are known to be the criteria in heat induced modifications, very short holds at 230° F. such as 10 to 30 seconds perhaps followed by extended holding, such as 3 to 10 minutes at 210° to 212° F. would be equivalent or even superior to the top range for present equipment of 212° F. for 10 minutes.

VARIATIONS AND DETAILS

Up to the vital point of modifying the proteins by steam injection into the heated condensed milk, variations may be made as in production of powdered nonfat milk heretofore. The heating prior to steam injection may be terminated slightly lower than the corresponding heating steps when steam injection was not being used, so as not to crowd too close to troublesome effects. The steam injection could begin at a lower temperature than here stated, but that would cause dilution with more water that would have to be removed.

The steam injector and tank, though of a type conventional for skim milk (not condensed), may be described as a small open tank, called a surge tank, with a single-jet steam injector (called a whizzer) liberating its jet near the tank bottom, thereby heating and vigorously agitating the contents.

I claim:

1. The method of producing a fluid milk product modified to improve flavor, texture and eye appeal, which includes:

A. producing a powdered skim milk additive, of an affectiveness for yielding detectable improvement of skimmilk as to flavor, texture and eye appeal when added in the proportion of 0.1 to 0.15%, by a continuous process including the steps of heating skim milk, by non-dilutive heating through pasteurization and to a temperature of about 185° to 190° F., thereafter further heating the milk by steam injection to a temperature of about 200° F. to 212° F., and holding it in this temperature range for a time, in the range of about five to thirty minutes, inversely correlated to temperature on the basis of about 212° F., if the holding time is 5 minutes, to about 200° F., if the holding time is thirty minutes; condensing the heated skim milk to a solids content of about 39% to 45%; heating the condensed milk first by a nondiluting heater to a temperature of about 175° F. and then, while avoiding coagulation, further heating the condensed skim milk by direct steam heating to a temperature of at least about 185° F. and holding at such temperature for a time in the range of about two to five minutes inversely correlated to temperature; and then spray-drying it to form said powdered skimmilk additive suitable for improving the flavor, texture and eye appeal of a fluid milk product and B. adding said powdered skim milk additive to a fluid milk product in an amount in the range of 0.2 to 0.3%.

* * * * *